United States Patent [19]
Ziu

[11] Patent Number: 5,141,261
[45] Date of Patent: Aug. 25, 1992

[54] DOUBLE CONTAINMENT PIPE JOINT ASSEMBLY

[75] Inventor: Christopher G. Ziu, Somerville, Mass.

[73] Assignee: Double Containment Systems, Monroe, Conn.

[21] Appl. No.: 681,331

[22] Filed: Apr. 4, 1991

[51] Int. Cl.⁵ ............................................. F16L 21/00
[52] U.S. Cl. .................................. 285/138; 285/133.1
[58] Field of Search ...................... 285/47, 138, 133.1

[56] References Cited

U.S. PATENT DOCUMENTS

| | | | |
|---|---|---|---|
| 1,160,703 | 11/1915 | Fleming | 285/133.1 |
| 1,481,255 | 1/1924 | Cumfer | . |
| 3,378,672 | 4/1968 | Blumenkranz | 219/200 |
| 3,506,519 | 4/1970 | Blumenkranz | 156/275 |
| 3,693,665 | 9/1972 | Veerling | 285/47 |
| 3,794,358 | 2/1974 | Allen et al. | 285/47 |
| 3,885,595 | 5/1975 | Gibson et al. | 285/47 |
| 3,920,787 | 11/1975 | McDowell et al. | 264/263 |
| 3,936,081 | 1/1976 | Blumenkranz | 285/231 |
| 3,956,817 | 5/1976 | Blumenkranz | 29/446 |
| 4,121,858 | 10/1978 | Schulz | 285/133.1 |
| 4,400,019 | 8/1983 | Fruck | 285/55 |
| 4,436,988 | 3/1984 | Blumenkranz | 219/544 |
| 4,560,188 | 12/1985 | Berti et al. | 285/47 |
| 4,640,532 | 2/1987 | Pope | 285/47 |
| 4,786,089 | 11/1988 | Ziu | 285/138 |
| 4,930,544 | 6/1990 | Ziu | 138/113 |
| 4,997,211 | 3/1991 | Brücher | 285/47 |

FOREIGN PATENT DOCUMENTS

| | | | |
|---|---|---|---|
| 218184 | 10/1958 | Australia | 285/133.1 |
| 1160247 | 12/1963 | Fed. Rep. of Germany | 285/133.1 |
| 1425489 | 5/1969 | Fed. Rep. of Germany | 285/133.1 |
| 3105406 | 2/1982 | Fed. Rep. of Germany | . |
| 34162 | 3/1978 | Japan | 285/138 |

Primary Examiner—Eric K. Nicholson
Attorney, Agent, or Firm—Kramer, Brufsky & Cifelli

[57] ABSTRACT

A double containment pipe joint assembly is provided with an inner pipe and an outer or containment pipe secured in concentric relation. The pipe joint assembly includes a fitting having end surfaces on concentric flanges which can be secured to a length of a primary and containment pipe at intervals along the pipeline wherein sections of the pipeline can be removed and repaired without the necessity of removing the whole pipeline. The concentric flanges are joined by a thickened divider ring which provides smooth fillets at its juncture with the flanges to reduce thermal stresses on the fitting.

7 Claims, 3 Drawing Sheets

DOUBLE CONTAINMENT PIPE JOINT ASSEMBLY

BACKGROUND OF THE INVENTION

1. Field of the Invention:

The present invention relates to double containment pipe fittings and their assembly.

2. Description of the Prior Art:

The general concept of providing a double or dual containment pipe system wherein an inner carrier pipe is concentrically located within an outer containment pipe to deliver dangerous or hazardous fluids is well known and an accepted commercial practice. Historical applications for such systems have been found in the nuclear, gas petroleum production and refining and chemical processing industries. The inner pipe is used to transport the hazardous or toxic fluid while the outer pipe is present to confine any leaks. Thus, it is also known to provide the annulus between the concentric pipes with various types of detectors and/or drainage apparatus to handle leakage. Examples of double containment pipe assemblies are shown in U.S. Pat. Nos. 4,786,088; 4,886,305 and 4,930,544.

With the advent of stricter governmental regulation concerning the piping of petroleum products and hazardous chemicals, the anticipated increased use of various types of pipes in double containment applications is a certainty. As such, the structural design of these fittings and method of installing and repair of double containment pipes containing such fittings is necessary.

The present invention provides novel double containment fittings for forming a double containment pipe joint. The products that have been developed to date have not completely addressed some of the unique problems that arise when a pipe is placed within another pipe.

One such problem is the ease of maintaining, modifying or repairing such systems. To date, all above ground pressure systems have been installed without the ability to assemble or disassemble the piping or components in modular sections. Therefore, if a repair is to be made, the original system manufacturer/contractor must be called in to facilitate the repair. In many designs, a repair of a certain section would not be feasible or even possible due to the location of the system with respect to adjacent equipment or building parts. What would be very helpful to most facility owners is the ability to have a modular system that is capable of being readily disassembled. A system capable of being readily disassembled would give the facility engineer the ability to have the section requiring modification or repair sent to a shop-type environment readily suitable and equipped to facilitate the change or repair.

Another problem is the ability to provide a means of internally anchoring the inner piping of a double containment piping system in a system with homogeneous inner-outer materials in a cost effective manner. While there have been other parts developed for this purpose (e.g., "Dogbone"-fitting), none have been designed to be able to withstand combined effects of pressure, thermal stress, pipe axial loads, pipe bending, pipe torsion, external soil loads, etc., acting concurrently on the part, due to both inner and outer conditions, under normal operating conditions. The previous parts designed are subject to possible premature failure due to the development of high residual stresses under relatively mild and commonly expected design conditions.

Still another problem is the ability to provide an efficient means of termination of double containment pipes in homogeneous systems, with all of the same considerations imposed in the above paragraph. Whenever a transition from double containment to single containment occurs, the parts will act as a point of rigid interconnection and as a point of anchorage.

Another such problem has to do with the ability of a system to withstand the effects of inner and outer piping and components that are subjected to different amounts of thermal expansion and contraction. It is the norm, rather than the exception, that the inner and outer pipes of a pressure rated double containment piping system are subjected to different amounts of thermal expansion. This situation may arise in several different ways. The most common way involves the situation whereby a hot fluid is transported through the inner pipe. Under this circumstance, the external environment (external that is to the outside diameter of the secondary containment piping) is normally at a lower temperature than the hot fluid. Since there is either an insulating dead air space between the two pipes, or other insulating material, the inner piping temperature becomes close to that of the fluid, while the outside piping remains closer to that of the external ambient environment. Therefore, the materials normally grow to different lengths due to their being at different temperatures. When this does occur, there are thermal strains that are imposed on interconnecting parts and on parts such as interstitial supports that create a contact point between the inner and outer piping. The most obvious place where there is a problem potential is at the interconnecting points. However, any place where loads can be transmitted back and forth between the two pipe systems can result in a problem. Usually, all interconnecting parts designed for this situation are constructed of a singular material, with such a design that the residual stresses and subsequent strain on the materials can lead to a failure of such parts. These existing parts then become the point in the overall system at which failure is most likely to occur, due to either mechanical failure resulting from exceeding the allowable stress of the material, or due to corrosion stress cracking, or other stress-induced phenomena. This is compounded by the fact that the components are truly single containment at that point, without having a containment area to prevent the hazardous fluids from reaching the environment. Therefore, exactly where it would be the least desirable location for failure to occur is the most likely place for failure to occur. Additionally, a double containment piping system that is constructed of an interconnecting part as described above, actually increases the chance that failure to the external environment can occur as compared to a singular containment piping system designed with proper treatment of the thermal expansion of its components.

While certain of these design criteria may have been incorporated in the prior art, none meet all. For example, the fittings illustrated in U.S. Pat. Nos. 4,786,088 and 4,930,544 (FIGS. 8 to 10), commonly referred to as "Dogbone" fittings, may be used to isolate sections of the pipe in the event of a leak, and may be used to enable both pipes to be coupled to each other and to function as a termination fitting. However, due to combined excessive stress on the material of the joint when thermal expansion or internal or annular pressures are encountered, failure of the joint is more likely to occur due to a lack of attention to stress risers and to a lack of reinforcement in areas that are highly susceptible to stress.

SUMMARY OF THE INVENTION

The novel pipe joint fittings disclosed in this application are designed to provide several significant benefits as compared to the prior art:

The fitting allows a double containment system to be constructed in modular sections without flanged ends. The fitting is provided with flanged connections which can be used on both the primary (inner) and secondary (outer) containment piping modular segment ends; however, they can also be used on the primary piping only when the secondary containment piping is terminated with the use of a termination fitting. When this part is to be used as a termination fitting, a flange may be provided on one side of the coupling, attached to the "primary" pipe portion. This may be done to allow the double containment piping system to be mated to a single wall flange, as would normally be the case when the system is connected to a pump, tank, vessel, heat exchanger or other equipment at its initiation point. However, the part does not need to be flanged. It may be directly welded if the associated equipment has the appropriate connection.

The fitting of the invention consists of a double coupling that is machined, molded or cast as a solid, one-piece part. The part may be constructed out of any metallic, thermoplastic or reinforced thermosetting plastic material. It is capable of having both inner and outer pipes attached to spaced flanges at one (if used as a termination fitting) or both ends which act as the points of interconnection between inner and outer pipe systems.

The part is designed in such a manner that there is less likelihood of its failure as compared to the "Dogbone" fitting of U.S. Pat. Nos. 4,786,088 and 4,930,544, due to an even distribution of stresses when thermal expansion is imposed, because of added reinforcement, and due to other aspects of its design such as strategically positioned fillets and smooth contours. In many applications involving moderate conditions, the "Dogbone" will experience combined stresses that are in excess of the allowable stresses for the material, particularly in thermoplastics, for which it is intended. Additionally, the localized areas subject to the highest degree of stress occur at the solid cross section of the component. Since this portion of the component is only single containment at this point, a catastrophic failure could be initiated at this point due to chemical stress cracking, which is likely to occur at the area of highest stress. This means that the "Dogbone" fitting is seriously flawed and could represent a part that is a potential "time bomb" in a thermoplastic system. The fitting of the present invention does not develop localized stresses anywhere near the magnitude shown to be experienced by the "Dogbone" fitting, making it much more suitable for the applications for which it is intended.

Thus, the new part described is designed in such a manner that it is much less likely to fail as compared to the existing solid type of interconnecting part that is presently being used. However, even if failure were to occur, the interconnecting fittings have an additional feature that the fluid can be contained within the secondary containment system, whereas the prior art system is formed from a singular member and has no such ability.

Another version of the fitting is disclosed which is used for the situation when some type of socket joining method is used to connect adjacent pipes to the coupling. The part serves as an internal anchor to anchor the primary pipe without interrupting the double containment aspect of the system at the anchoring point, and creates separate compartments or zones in a double containment piping system so as to isolate different annular sections. It can also serve as a means of initiating or terminating the double containment piping system. The part is also designed in such a manner that there is less likelihood of its failure as compared to the "Dogbone", due to an even distribution of stresses when thermal expansion is imposed, because of added reinforcement, and due to other aspects of its design such as strategically positioned fillets and smooth contours.

Thus, there are a number of advantages of this coupling over previously existing parts. (1) The coupling is designed in such a manner that there is less likelihood of its failure as compared to conventional parts, due to an even distribution of stresses when thermal expansion and combined loads (e.g., thermal, internal and external pressure, bending, torsion, axial thrusts, earthquakes, etc.) is imposed, by virtue of added reinforcement and due to its unique design incorporating strategically positioned fillets and smooth contours; (2) It is optionally designed for use in socket-joining applications; and (3) It is also intended for use in metallic and FRP applications as opposed to just thermoplastic systems.

BRIEF DESCRIPTION OF THE DRAWINGS

Further objects and advantages of the invention will become more apparent from the following description and claims, and from the accompanying drawings, wherein:

DETAILED DESCRIPTION OF THE PREFERRED EMBODIMENT

Figure 1A:
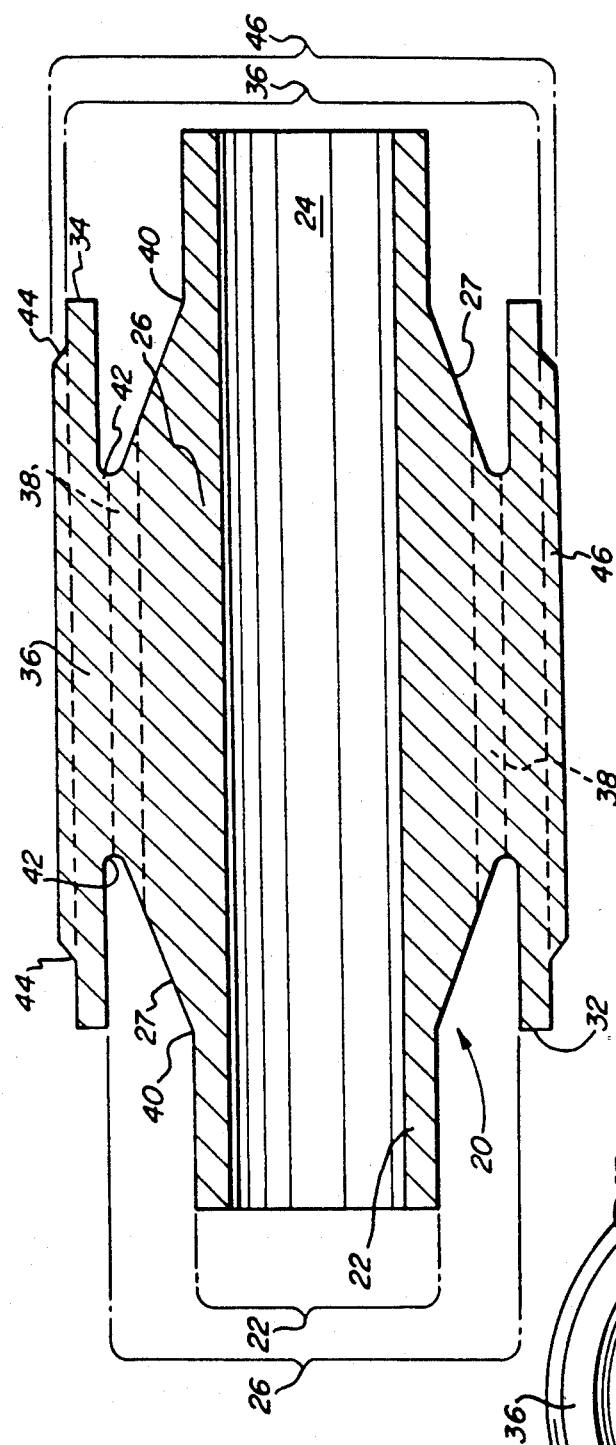
FIG. 1A is a longitudinal cross-sectional view of a pipe coupling member or fitting of the double containment pipe joint assembly of the present invention.
Figure 2:
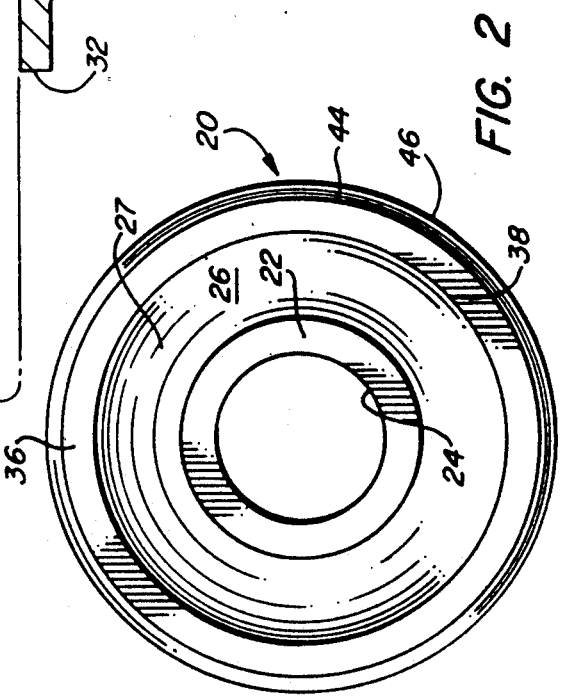
FIG. 2 is an end view in elevation of the pipe joint member illustrated in FIG. 1 as seen from the left-hand side of FIG. 1A and FIG. 1B.
Figure 1B:
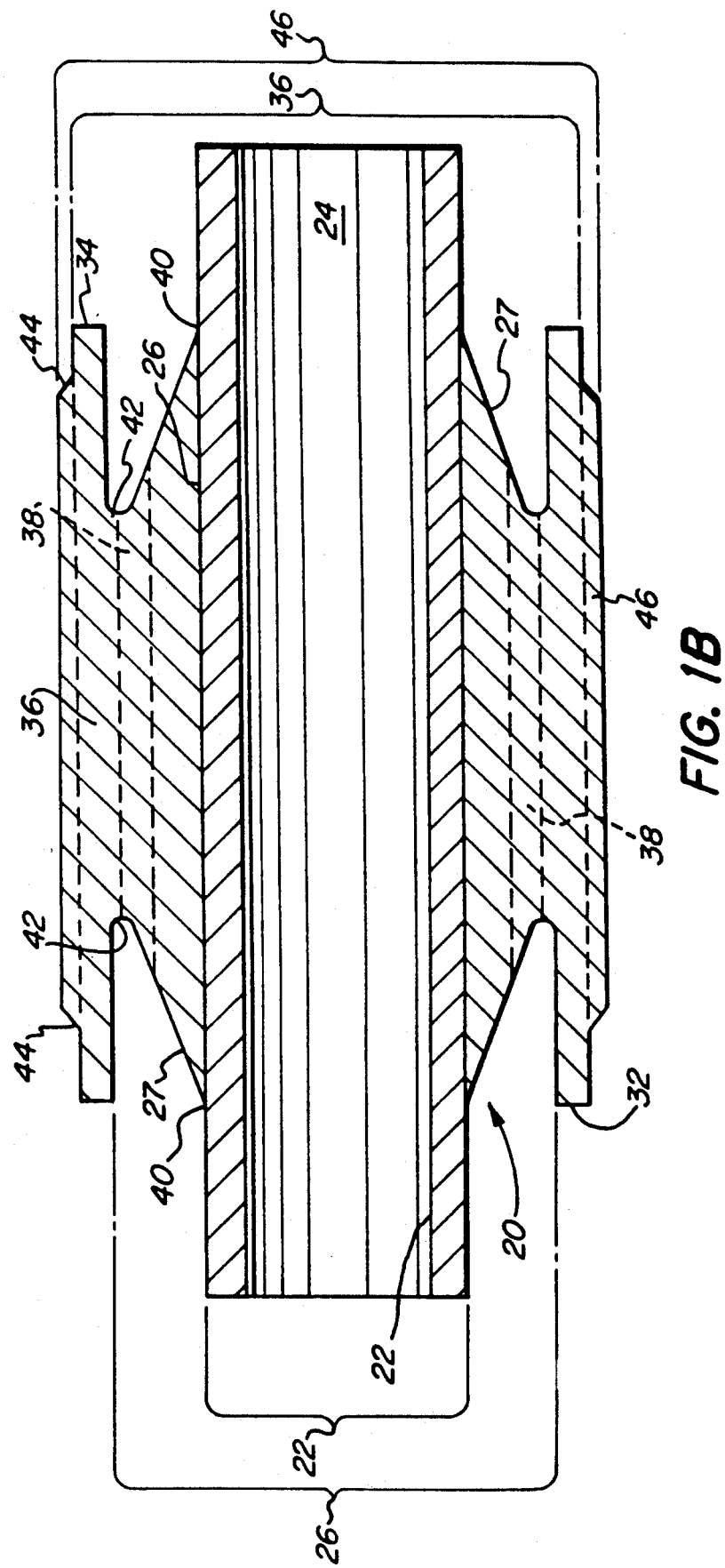
FIG. 1B is a longitudinal cross-sectional view of a pipe coupling member or fitting of the double containment pipe joint assembly of the present invention with a separate tubular body portion.

Referring now to the drawings in detail, wherein like numerals indicate like elements throughout the several views, FIGS. 1A, 1B and 2 illustrate a pipe joint coupling or fitting 20 adapted to be coupled with an outer or containment pipe and an inner (or primary) pipe to form a double containment pipe joint assembly. The fitting 20 can be constructed of any type of metal (e.g., cast, cast with secondary machining, or machined from a solid part), reinforced thermosetting plastic material (e.g., cast, or thermoplastic material; e.g., injection molded or machined from a solid part).

Generally, the pipe joint coupling or fitting 20 includes an elongated tubular body portion 22 having a cross-sectional area conforming to the cross-sectional area of the primary pipe of the double containment system. As shown in FIGS. 1 and 2, this cross-sectional shape is generally circular.

The main fluid contained within the system will flow through the bore 24 of fitting 20. The central portion of the tubular body portion 22 of fitting 20 is provided with concentric ring 26 circumscribing its mid-portion and having flared or conical ends 27 joining the ring 26 to tubular body portion 22.

The fitting 20 also includes an integral annular flange 36 about the outer circumstance of ring 26 which is spaced at its ends 32,34 from the ring 26 and tubular body portion 22.

A double containment pipe joint assembly is formed by attaching a length of inner pipe, such as by welding, adhesive bonding or solvent cementing, (dependent on the material of the inner pipe) to one or both ends of tubular body member 22, while similarly, a length of containment or outer pipe may be adhered to one or both of the outer ends 32,34 of ring 36 of the pipe fitting 20 to complete the double containment assembly. In the event of a leak from the inner pipe connected to tubular body portion 22 of fitting 20, the leak will be contained within a section of the outer pipe between the rings 26 of spaced fittings 20. This section can be repaired simply by removing the coupling 20 supporting the containment pipe or the containment pipe itself and repairing the leak in the inner pipe between that section of the containment pipe. By use of flanged coupling members, the inner and outer pipes of the double containment pipe assembly system do not require flanges or other connectors. The inner and outer pipes can merely be attached to the ends of tubular member 22 and flange 36, respectively.

The concentric ring 26 attached to tubular body portion 22 of pipe fitting 20 is increased in diameter by virtue of its conical end connections 27 and thus strengthened to absorb thermal expansion of either the inner or outer pipes of the double containment pipe construction. Further, the ring 26 can be formed with fillets 40 and 42 at the juncture of the conical ends 27 of ring 26 to tubular body portion 22 to smooth out stresses and to prevent stress-risers. Flange 36 may be strengthened or reinforced with a secondary ring portion 46 provided with fillets 44 at its juncture with the flange 36 to add structural strength to fitting 20 and smooth out thermal stresses.

Fitting 20 may also be provided with two or more annular slots 38 through ring 26 for use when the fitting 20 is installed mid-stream and it is required to have continuous fluid flow capability/air venting or purging capabilities.

If desired, rather than being formed from one piece, the fitting 20 may incorporate an outer member, as shown in FIG. 1B receiving a separate tubular body portion 22 within ring 26. The outer member can be attached to the inner tubular portion by means of suitable bonding material to result in a double coupling, capable of having both inner and outer pipes attached to it, and acting as a point of interconnection between inner and outer pipe systems. The additional advantage of this coupling is that the coupling can be manufactured from dissimilar inner and outer materials, thus allowing it to be readily incorporated into pipe systems with dissimilar inner and outer materials.

Figure 4:
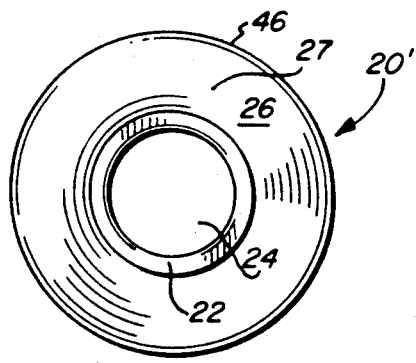
FIG. 4 is an end view in elevation of the pipe joint member of FIG. 3 as seen from the left-hand end of FIG. 3.
Figure 3:
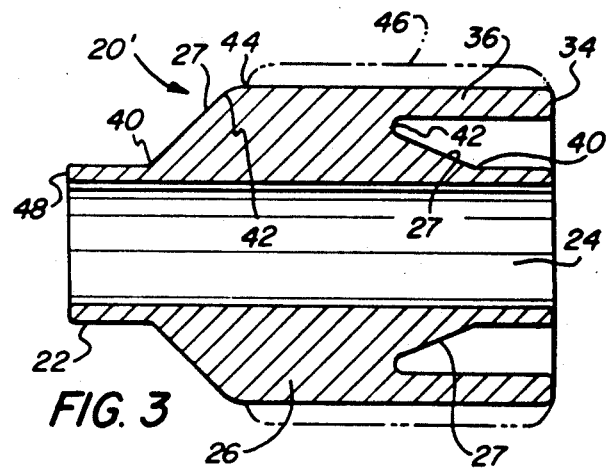
FIG. 3 is a longitudinal cross-sectional view of a modified form of a pipe joint coupling member of FIG. 1A of the double containment pipe joint assembly of the present invention specifically used as a termination coupling.

FIGS. 3 and 4 illustrate that a coupling or fitting 20' similar in all respects to fitting 20, as indicated by the identical numerals, can be provided with end 32 of flange 36 truncated and removed, while tubular body portion 22 terminates flush or in the same plane as end 34 of flange 36. The coupling 20' is useful for the case where the secondary containment is terminated via the ring 26 and tubular body portion 22 is plugged at end 48.

Figure 6:
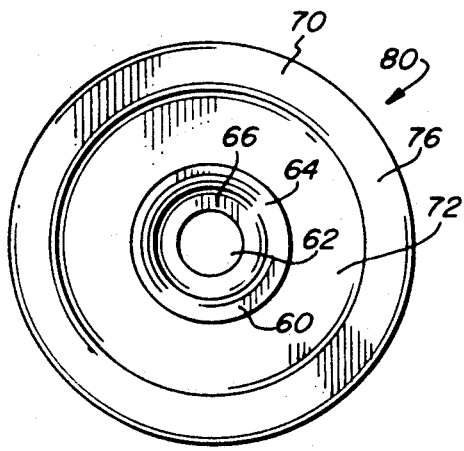
FIG. 6 is an end view in elevation of the double containment pipe joint coupling illustrated in FIG. 5 as seen from the left-hand side of FIG. 5.
Figure 5:
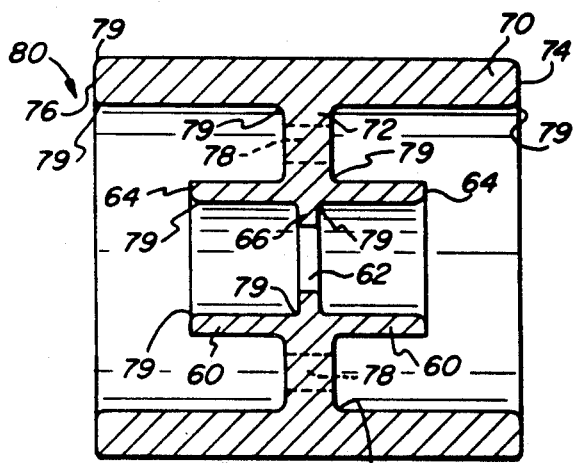
FIG. 5 is a longitudinal cross-sectional view of still another double containment pipe joint coupling in accordance with the present invention.

A second embodiment of a pipe joint fitting or coupling formed in accordance with the concepts of the present invention is illustrated in FIGS. 5 and 6 by the numeral 80. The pipe joint assembly 80 is formed with an outer or containment pipe annular flange 70 integrally connected by a thick divider ring or annulus 72 to two inner annular pipe flanges 60. The flanges 60 form a tubular body whose end faces 64 may receive in nested engagement (along the inner or outer diameter of flange 60) the primary or inner modular pipe of the system and have an opening 62 in a wall 66 therebetween serving to establish communication between the inner pipe sections or modules. The nested inner pipes may be welded or otherwise attached to flange 60. Wall 66 precludes over insertion or a stop for an inserted, inner pipe.

Similarly, the outer flange 70 has end faces 74,76 which can be placed in nested engagement (either along the inner or outer diameter of flange 70) in a suitable manner, e.g., by welding or bonding, to an outer, or double containment pipes corresponding to each modular, inner pipe section. Two or more annular cutouts 78 may be provided in ring 72 to have continuous fluid flow capability/air venting or purging capabilities in the outer or containment pipe.

Besides the thickened reinforcement ring 72, and flanges 60,70, smooth fillets 79 are provided at all the junctures of the flanges with ring divider 72 and at the corners of each flange along its respective end face to prevent stress risers due to concurrent thermal loads, internal pressure, external pressure and other effects from occurring.

Figure 8:
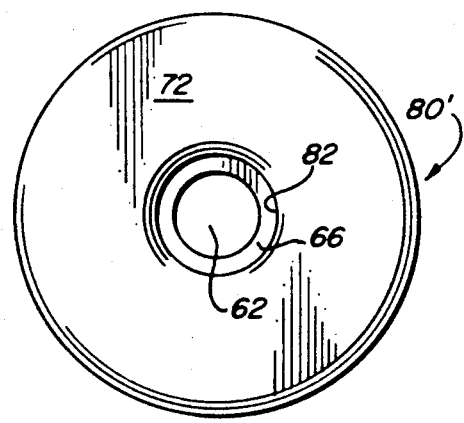
FIG. 8 is a side view in elevation of the inner pipe joint member or fitting of FIG. 7 as seen from the left-hand side of FIG. 7.
Figure 7:
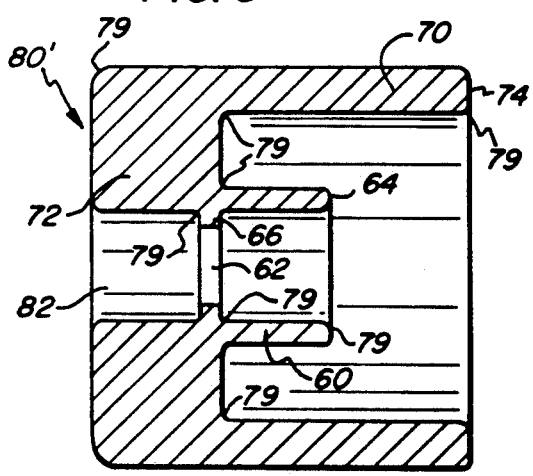
FIG. 7 is a longitudinal cross-sectional view through a second form of the pipe coupling of FIG. 5, specifically used as a termination coupling.

As in FIGS. 3 and 4 relating to fitting 20', the fitting 80 may be formed as shown in FIGS. 7 and 8 as fitting 80', similar in all respects to fitting 80, as indicated by the identical numerals, but with end face 76 of flange 70 truncated and removed, while ring 72 is further thickened. The coupling 80' is useful for the case where the secondary containment is terminated via ring 72 and the opening 62 is plugged by inserting a plug in opening 82 in ring 72.

What is claimed as new is:

1. A double containment pipe joint assembly comprising:

a pipe fitting having tubular body provided with an inner annular flange provided with a bore therethrough adapted to be joined along at least one end surface to a first pipe, an outer annular flange connected by a ring encircling said tubular body to said tubular body having an end face adapted to be secured to a second or containment pipe, said ring having a thickness greater than the thickness of said inner or outer annular flange, said outer annular flange being concentrically mounted about and spaced from the tubular body portion of said fitting, and said ring being formed as one piece and having on one end a first substantially conical end surface in cross-section between said outer flange and tubular body portion, and having on the other end a second substantially conical end surface in cross-section between said outer flange and tubular body portion, said second conical end surface being tapered in a substantially opposite direction relative to said first conical end surface, said outer annular flange and said tubular body being joined to said ring by a smooth fillet throughout the length of a juncture for reducing thermal stresses on said fitting.

2. A double containment pipe joint assembly in accordance with claim 1 wherein said pipe fitting is formed from one-piece of solid material.

3. A double containment pipe joint assembly comprising:

a pipe fitting having a generally tubular body provided with an inner annular flange including an aperture formed therethrough and adapted to be joined to a first pipe, an outer annular flange connected by a ring encircling said tubular body and said tubular body having a surface adapted to be secured to a second or containment pipe, said outer annular flange being made of a different material in comparison to the material of said tubular body, said ring being formed as one piece and having a thickness greater than the thickness of said inner or outer annular flange, said ring defining on one end a substantially conical-tapered end surface and defining on the other end another substantially conical-tapered end surface tapered in substantially the opposite direction in comparison to the other end surface, said outer annular flange being concentrically mounted about and spaced from the tubular body portion of said fitting, and said outer annular flange and said tubular body each being joined to said ring by smooth fillets throughout the length of a juncture for reducing thermal stresses on said fitting.

4. A double containment pipe joint assembly comprising:

a pipe fitting having a generally tubular body provided with an inner annular flange defining an aperture extending therethrough and adapted to be joined along a surface thereof to a first pipe, an outer annular flange connected by a ring encircling said tubular body to said tubular body having a surface adapted to be secured to a second or containment pipe, said ring being formed as one piece and having a thickness greater than the thickness of said inner or outer annular flange, said ring including on one end a substantially conical end surface located between said outer annular flange and said tubular body, and including on the other end another substantially conical end surface located between said outer annular flange and said tubular body, said conical end surfaces being tapered in substantially opposite directions relative to each other, said outer annular flange being concentrically mounted about and spaced from the tubular body portion of said fitting, said outer annular flange and said tubular body each being joined to said ring by smooth fillets throughout the length of a juncture for reducing thermal stresses on said fitting.

5. A double containment pipe joint assembly comprising:

an inner tubular body provided with an aperture extending therethrough, an outer tubular body connected by a ring encircling said inner tubular body to said inner tubular body, said ring having a thickness greater than the thickness of said inner or outer tubular bodies, said outer tubular body being concentrically mounted about and spaced from said inner tubular body by said ring, said ring being formed as one piece and having a first substantially conical-tapered end surface in cross-section located between said outer tubular body and said inner tubular body, and a second substantially conical-tapered end surface in cross-section located between said outer tubular body and said inner tubular body on an opposite end of said ring relative to said first conical-tapered end surface, said first and second end surfaces being tapered in substantially opposite directions relative to each other.

6. A double containment pipe joint assembly as defined in claim 5, wherein said inner tubular body includes an inner flange for joining along at least one end surface of said inner flange to a first pipe.

7. A double containment pipe joint assembly as defined in claim 5, wherein said outer tubular body includes an outer flange for joining along at least one end surface of said outer flange to a second pipe.

* * * * *